United States Patent Office 2,976,138
Patented Mar. 21, 1961

2,976,138

STABILIZED TRACE ELEMENT SOLUTIONS FOR CORRECTING SOIL DEFICIENCIES

Jackson B. Hester, Elkton, Md., assignor to Suburban Propane Gas Corporation, Whippany, N.J., a corporation of New Jersey No Drawing. Filed July 30, 1958, Ser. No. 751,857

6 Claims. (Cl. 71—1)

This invention relates to ammoniacal trace element soil additive compositions, and to the method of increasing the trace element content of soils therewith.

The soil additive composition of the present invention is an ammoniacal solution of trace elements which includes complex ammonium salts of the trace elements.

Extensive investigations of thousands of soils for available trace elements indicate the general need of added trace elements for adequate plant nutrition. The improved aqueous ammonium-trace element solution of the present invention is designed to supplement the soil contents and fulfill the requirements of agricultural plants for trace elements.

The improved composition of the present invention is a stabilized solution in which the trace elements are kept in solution, dissolved and combined with the aqueous ammonia and ammonium sulfate to give a solution which can advantageously be used as a trace element fertilizer composition. It supplies the trace elements in an alkaline medium and supplies ammonia in combined form as an important fertilizer material.

The improved soil additive compositive can advantageously be used by applying it directly to the soil with the use of equipment such as is used for the application of anhydrous ammonia and liquid fertilizers, with a tank for the solution and a metering device such as is used for liquid fertilizers.

The trace elements which are dissolved in ammonia and present in the new ammoniacal trace element composition advantageously include the following, namely: molybdenum, cobalt, nickel, copper, zinc, manganese and boron. While some of these trace elements may be omitted, they are all advantageously included.

These trace element nutrients can be brought into solution in strong aqueous ammonia and are more advantageous when so utilized than when used in dry application of fertilizer elements.

The use of strong aqueous ammonia for dissolving the trace elements is an advantageous way of supplying nitrogen to the soil along with the trace elements.

The incorporation of the trace elements in ammoniacal solution enables them to be supplied effectively and evenly to the soil.

The invention will be further illustrated by the following example:

To 66 parts by volume of 28 to 30% aqueous ammonium hydroxide there is added 20 parts by volume of water, and the following trace elements and ammonium sulfate are dissolved in this solution in the following order:

0.5 part by weight of molybdic acid, 85%
20 parts by weight of $(NH_4)_2SO_4$ (ammonium sulfate)
0.6 part by weight of $CoSO_4 \cdot 6H_2O$ (cobalt sulfate)
0.55 part by weight of $NiCl_2 \cdot 7H_2O$ (nickel chloride)
5.5 parts by weight of $CuSO_4 \cdot 5H_2O$ (copper sulfate)
8.8 parts by weight of $ZnSO_4 \cdot 6H_2O$ (zinc sulfate)
11.2 parts by weight of $MnSO_4 \cdot 7H_2O$ (manganese sulfate)
5.0 parts by weight of $H_3BO_3$ (boric acid)

The final volume is made up to 100 parts by volume with water.

The approximate content of trace elements and of nitrogen of the resulting solution is as follows and proportions with respect to one another, in the form, indicated:

| | Percent |
|---|---|
| Nitrogen | 24 |
| $MoO_3$ | 0.4 |
| $CuSO_4$ | .5 |
| $MnSO_4$ | 10 |
| $ZnSO_4$ | .5 |
| $NiSO_4$ | 0.5 |
| $CoSO_4$ | 0.5 |
| $H_3BO_3$ | 5 |

In making this solution the molybdic acid is dissolved first because of its low solubility except in strong ammoniacal solutions. Boric acid can also be dissolved at this point, or as a final addition to the solution.

The addition of the ammonium sulfate increases the ammonia and nitrogen content of the solution and also assists in the formation of complex trace element-ammoniacal sulfate salts.

Although strong aqueous ammonia is used for dissolving the trace element salts, the free ammonia of this solution is more or less completely combined to form the complex ammoniacal salts, so that the final solution may be free from free ammonia, although the final solution may advantageously contain a small excess of ammonium hydroxide. All free ammonia can be eliminated from the final solution by slightly lowering the ammonium hydroxide content in proportion to the other elements.

The resulting ammoniacal trace element solution can be applied directly to the soil to supply both trace elements and nitrogen. It can also advantageously be applied with anhydrous ammonia which supplements the ammonia content of the solution and creates an alkaline condition in the soil, or an increased alkaline condition, at the time of application of the trace elements.

No special equipment is necessary for the application of the solution other than a tank and a metering device such as is used for application of anhydrous ammonia and liquid fertilizer.

Thus, anhydrous ammonia is commonly applied to the soil from a tank carried by an applicator or tractor, with control devices for discharging the ammonia in a trench below the surface of the soil.

A tank of the soil additive composition of the present invention can be carried by the same tractor and applicator, and needed amounts supplied through a pipe to the same trench to which the anhydrous ammonia is supplied. Or the anhydrous ammonia can be blended with the ammoniacal solution and the resulting mixture supplied to the soil.

Thus, with an applicator or tractor having two tanks, one would contain anhydrous ammonia and the other the aqueous ammoniacal solution of the trace elements. By using suitable pumps and blending devices or proportioning valves, the anhydrous ammonia and the ammoniacal solution can be blended together before they're discharged into the soil. For example, apparatus such as is shown in U.S. Patents 2,424,520 and 2,781,612 can be used for supplying the ammoniacal solution, either alone or together with anhydrous ammonia, and either separately or in admixture.

The use of an aqueous ammoniacal solution of the trace elements has the advantage that it supplies nitrogen in the form of ammonia as a desirable soil additive, along with the trace elements, and tends to give an alkaline reaction where the solution is applied to the soil. When the solution is used together with anhydrous ammonia, the alkaline nature of the soil will be increased.

The use of an ammoniacal solution has the advantage of making available to the plants trace elements such as those above referred to at high pH values where the ammonia or ammoniacal solution is introduced. And the availability of these trace elements is continued as the ammonia is oxidized to nitrates which develop nitric acid, thus maintaining a high availability of these elements.

The above ammoniacal solution of the trace elements has the advantage that it is a concentrated solution containing the trace elements in the form of soluble salts and complexes, and can be applied to the soil as a concentrated solution, such that only a small amount of the strong solution is required. The solution can be somewhat diluted; but the use of the concentrated solution has the advantage that a tank of the solution carried by an applicator or tractor will enable a relatively large area to be fertilized with the solution before the tank needs refilling.

In special cases where all of the trace elements are not required for addition to the soil, one or more of the trace elements may be omitted. But in general, most if not all of the trace elements of the above composition are desirable in fulfilling the requirements of agricultural plants and trace elements.

I claim:

1. The method of producing an ammoniacal trace element soil additive composition which comprises dissolving in strong aqueous ammonia at least one acid from the class consisting of molybdic and boric acids and a number of trace element salts of metals from the class consisting of copper, manganese, zinc, nickel and cobalt, together with ammonium sulfate, the acid and the trace element salts dissolved being in proportions to form ammonium and complex ammonium salts of the trace elements, and the amount of aqueous ammonia being in excess of that necessary to react with the trace element salts, so that the resultant ammonium and complex ammonium salts are dissolved in an aqueous ammoniacal solution.

2. The method of producing an ammoniacal trace element soil additive composition as set forth in claim 1, in which the acid is dissolved in the aqueous ammonia before the salts of the metals are dissolved therein.

3. The method of producing an ammoniacal trace element soil additive composition which comprises dissolving in strong aqueous ammonia molybdic acid, boric acid, and salts of cobalt, nickel, copper, zinc and manganese together with ammonium sulfate in amounts such that the ammonia is largely combined with the trace elements in the form of salts and complex ammonium salts, the amount of aqueous ammonia being in excess of that necessary to react with the molybdic acid, the boric acid and said salts so that the resultant ammonium and complex ammonium salts are dissolved in an aqueous ammoniacal solution.

4. The method of producing an ammoniacal trace element soil additive composition which comprises adding to and dissolving in strong aqueous ammonia the following trace element compounds and ammonium sulfate in approximately the following proportions with respect to one another:

0.5 part by weight of molybdic acid, 85%
20 parts by weight of $(NH_4)_2SO_4$ (ammonium sulfate)
0.6 part by weight of $CoSO_4 \cdot 6H_2O$ (cobalt sulfate)
0.55 part by weight of $NiCl_2 \cdot 7H_2O$ (nickel chloride)
5.5 parts by weight of $CuSO_4 \cdot 5H_2O$ (copper sulfate)
8.8 parts by weight of $ZnSO_4 \cdot 6H_2O$ (zinc sulfate)
11.2 parts by weight of $MnSO_4 \cdot 7H_2O$ (manganese sulfate)
5.0 patrs by weight of $H_3BO_3$ (boric acid)

the amount of aqueous ammonia being in excess of that necessary to react with the trace element compounds so that the resultant ammonium and complex ammonium salts are dissolved in an aqueous ammoniacal solution.

5. The method of increasing the trace element content of soils which comprises applying to the soil an ammoniacal solution of a number of ammonium and complex ammonium salts of metals from the class consisting of molybdenum, boron, copper, manganese, zinc, nickel and cobalt produced by dissolving in strong aqueous ammonia at least one acid from the class consisting of molybdic and boric acids and a number of trace element salts of metals from the class consisting of copper, manganese, zinc, nickel and cobalt, together with ammonium sulfate, the acid and the trace element salts dissolved being in proportions to form ammonium and complex ammonium salts of the trace elements, and the amount of aqueous ammonia being in excess of that necessary to react with the trace element salts, so that the resultant ammonium and complex ammonium salts are dissolved in an aqueous ammoniacal solution.

6. A soil additive consisting essentially of an aqueous ammoniacal solution of a number of ammonium and complex ammonium salts of trace elements of metals from the class consisting of molybdenum, boron, copper, manganese, zinc, nickel and cobalt and produced by dissolving in strong aqueous ammonia at least one acid from the class consisting of molybdic and boric acids and a number of trace element salts of metals from the class consisting of copper, manganese, zinc, nickel and cobalt, together with ammonium sulfate, the acid and the trace element salts dissolved being in proportions to form ammonium and complex ammonium salts of the trace elements, and the amount of aqueous ammonia being in excess of that necessary to react with the trace element salts, so that the resultant ammonium and complex ammonium salts are dissolved in an aqueous ammoniacal solution.

References Cited in the file of this patent

UNITED STATES PATENTS

| 2,760,866 | Nielsen | Aug. 28, 1956 |
| 2,770,538 | Vierling | Nov. 13, 1956 |
| 2,806,773 | Pole | Sept. 17, 1957 |

UNITED STATES PATENT OFFICE
CERTIFICATION OF CORRECTION

Patent No. 2,976,138                     March 21, 1961

Jackson B. Hester

It is hereby certified that error appears in the above numbered patent requiring correction and that the said Letters Patent should read as corrected below.

Column 1, line 36, for "compositive" read -- composition --; column 2, line 7, after "follows" insert -- , in the form --; line 8, strike out ", in the form,"; column 4, line 16, for "patrs" read -- parts --.

Signed and sealed this 15th day of August 1961.

(SEAL)
Attest:

ERNEST W. SWIDER                                DAVID L. LADD
Attesting Officer                                    Commissioner of Patents